(No Model.)  3 Sheets—Sheet 1.

H. M. & J. M. CRIPPEN.
VEHICLE BRAKE.

No. 302,471.  Patented July 22, 1884.

Attest:
S. Walter Fowler,
H. B. Applewhaite,

Inventors:
Henry M. Crippen
John M. Crippen
per Attys
A. N. Evans & Co.

(No Model.) 3 Sheets—Sheet 2.

H. M. & J. M. CRIPPEN.
VEHICLE BRAKE.

No. 302,471. Patented July 22, 1884.

Attest:
J. Walter Fowler
H. B. Applewhaite

Inventors:
Henry M. Crippen
John M. Crippen
per atty
A. H. Evans & Co.

(No Model.) 3 Sheets—Sheet 3.

H. M. & J. M. CRIPPEN.
VEHICLE BRAKE.

No. 302,471. Patented July 22, 1884.

Attest:
Walter Fowler
H. B. Applewhaite

Inventors
Harry M. Crippen
John M. Crippen
per Atty
A. H. Evans & Co

UNITED STATES PATENT OFFICE.

HENRY M. CRIPPEN AND JOHN M. CRIPPEN, OF BIG RUN, OHIO.

VEHICLE-BRAKE.

SPECIFICATION forming part of Letters Patent No. 302,471, dated July 22, 1884.

Application filed April 2, 1884. (No model.)

*To all whom it may concern:*

Be it known that we, HENRY M. CRIPPEN and JOHN M. CRIPPEN, citizens of the United States, residing at Big Run, Athens county, and State of Ohio, have invented a new and useful Improvement in Vehicle - Brakes, of which the following is a full, clear, and exact description, reference being had to the accompanying drawings, making part of this specification, in which—

Figure 1:
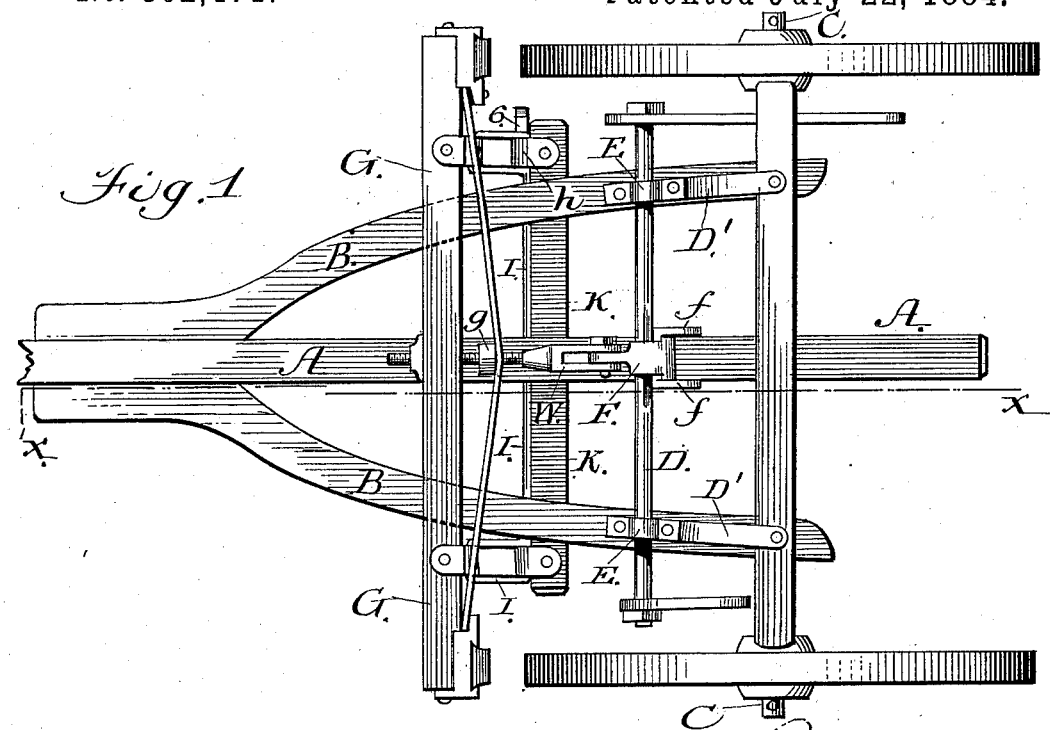
Figure 2:
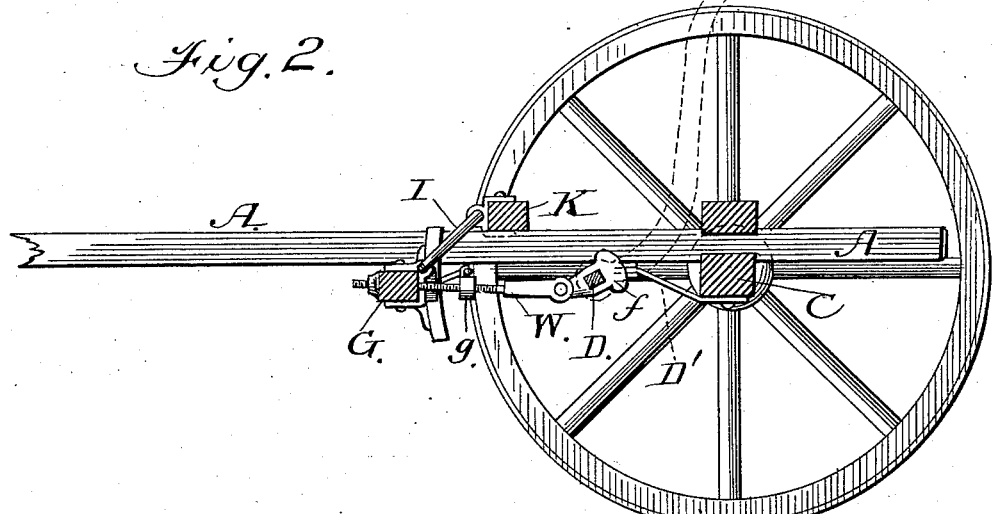
Figure 3:
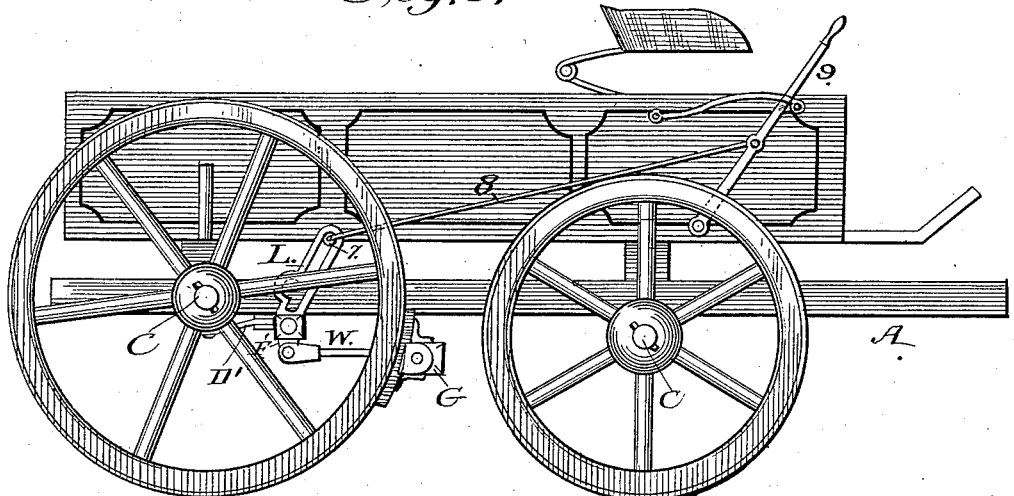
Figure 4:
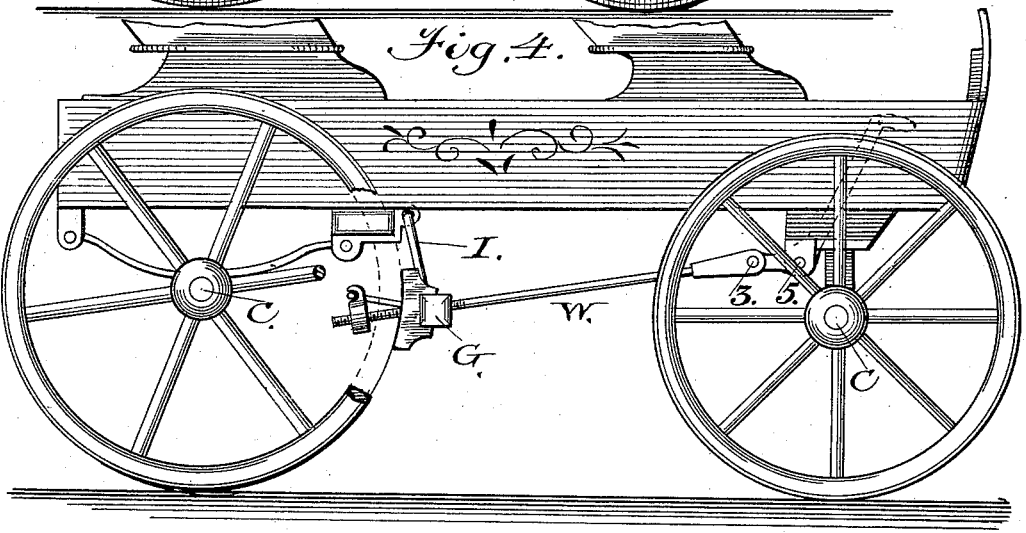
Figure 5:
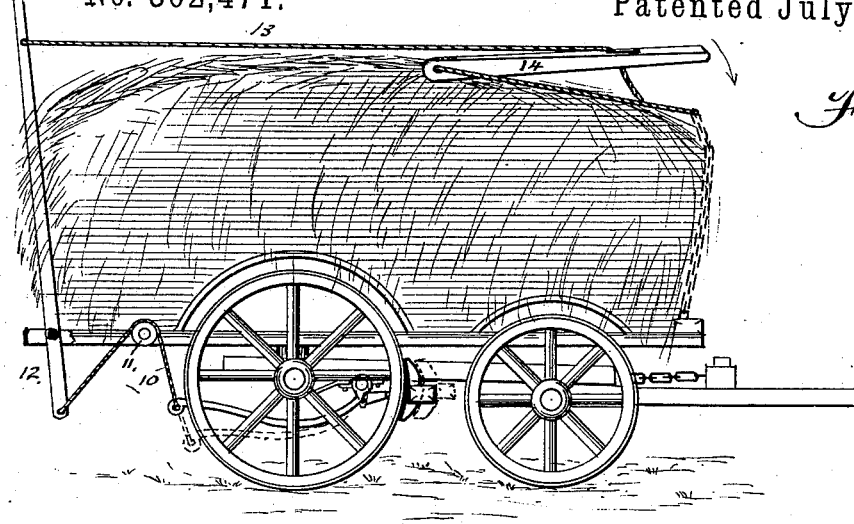
Figure 6:
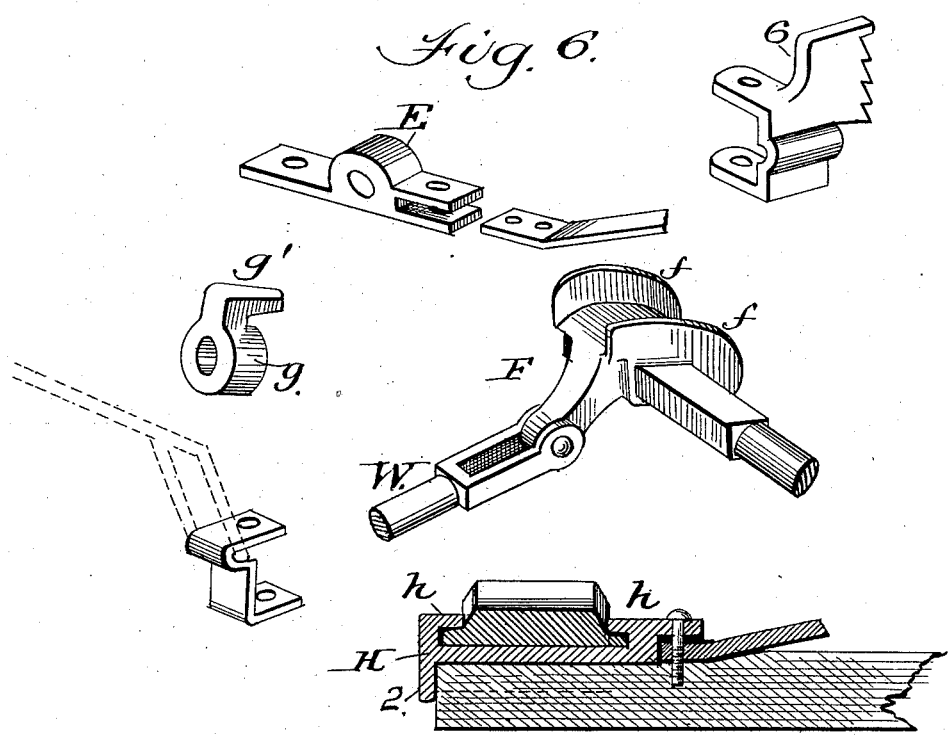

Figure 1 represents a bottom plan view of a running-gear of a vehicle with our improvements attached. Fig. 2 is a longitudinal sectional view on line $x$ $x$ of Fig. 1. Fig. 3 is a side view of a wagon with our improvements attached and showing the slotted lever. Fig. 4 is a side view of a spring-wagon with our improvements attached. Fig. 5 are details. Fig. 6 shows the means for locking the brake when attached to a wagon.

Our invention has for its object a convenient and efficient means for locking the wheels of the vehicle by producing a steady and equal friction on both wheels, and equalizing the friction when one rubber may be more worn than the other, or even when one rubber may be entirely lost or displaced; and it consists of the combination of devices hereinafter described and explained.

In order to enable others skilled in the art to make and use our invention, we will proceed to describe the exact manner in which we have carried it out.

In the drawings, A represents a coupling-pole, B the hounds, and C the axle of an ordinary running-gear of a vehicle. Beneath the hounds and attached thereto we secure the roller-bar D by means of the bearings E and braces D′, secured to the hounds and the axles. From the center of the roller-bar D descends an arm, F, provided with a square opening adapted to fit the squared portion of the roller-bar. The arm F is provided with flanges $f$, which extend upward on each side of the coupling-pole A, and prevent lateral movement of the arm and roller-bar, while the said arm is provided with a threaded extension which passes through the rubber-bar G, and is held in place by a threaded bearing secured to the front of the rubber-bar, as shown. The thread being through the wood, the plate may be left off, as the strain is on the truss-rod, not on the wood. The arm F is also connected to a draw-bar, W, formed with an eye, by means of which the draw-bar and roller-bar are secured together by a bolt or other well-known means, and the said draw-bar is provided on its threaded extension, in the rear of the rubber-bar G, with an adjustable nut, $g$, formed with a projecting lip, $g'$, against which the truss-rod rests, and which passes along the rear of the rubber-bar, to which its outer ends are bolted. On each end of the rubber-bar G is securely fastened the rubber-block holders H, which are formed in the manner shown in Fig. 6, and are provided with flanges 2, by which they are secured to the ends of the rubber-bar. These rubber-block holders are each provided with inwardly-projecting lips $h$, which are adapted to receive and securely hold a corresponding portion formed on the brake-blocks by driving the same into block-holders. It will be noticed that the truss-rod passes over the bar W. The object of this is to more securely hold the rubber-bar from springing down at the ends when in contact with the wheels, while the adjustable nut and threaded portion of arm before referred to permit the bar W to be adjusted, so that the distance between the rubber-bar and arm can be regulated, thereby giving a proper position of throw to the rubber-blocks, and also regulating the position of the lever upon the ratchet.

We do not wish to limit ourselves to the arrangement herein specified, for we have shown in Fig. 4 the devices applied, with a slight change, to a wagon, in which the parts are to some extent reversed, the threaded ends of draw-bar W being passed through the rubber-bar from the front side and into the nut which holds the truss-rod, and may be operated from the front, as shown in the figure, which shows the lever so arranged that when it is thrown forward by the operator the said lever, which is pivotally secured between flanges formed on a plate secured to the bottom of a vehicle-body, allows the pivot 3 to pass the center of the pivot 5, which not only locks but holds the rubber-bar in a locked position against the wheels, and when this construction is used we can dispense with the ratchet on the body, as the wheels remain locked until the lever is released.

The swinging rubber-bar G is suspended beneath the hounds by means of an equalizing-bar, I, the ends of which are formed with loops, which project downward and have bearings in loops or eyes secured to the swinging rubber-bar, as shown, and prevent any lateral motion of the bar I, which is suitably journaled on the cross-bar K in such a manner that the said bar will be about on a line with the inner face of the rubber-blocks, which prevents twisting and rattling when in use. The bearing 6 of the equalizing-bar is so constructed that its outer end is formed with a ratchet or notched plate, which engages the lever when the brake is applied. It is evident from this construction that when the lever-arm is thrown forward and into the ratchet the roller-bar is revolved in its bearings and the arm F carried back, bringing with it the rubber-bar, truss-rod, and draw-bar, and drawing the rubber-block against the wheels. The draw-bar being fastened to the center of rubber-bar develops the fact that the pressure is equal upon the wheels, and the peculiar location of the bearings for the roller-bar, it being fastened to the hounds and axles, brings the draft direct from the axles to the rubber-bar, thereby preventing all strain upon the hounds. It is a common thing for a difference to occur in the thickness of the rubber-blocks, and in case of this the equalizing-bar will spring by the continued pressure upon the lever to compensate for the difference, and when released the ends of said rubber-bar are instantly carried back to their normal position. At the end of the roller-bar opposite the lever-arm we attach the slotted lever-arm L, as shown in Fig. 3. The object of this construction is to produce great power and throw to the rubber-bar. It is evident that when the lever upon the body of the wagon is thrown forward the small roller 7 is so arranged that it is forced to the top of slot by means of the connecting-rod 8 and hand-lever 9, where it has the greatest leverage, and as soon as released in front it drops to the bottom of said slot, and is forced into a notch formed in the lever near the roller-bar, and is thereby forced to its limit with but little motion of the front lever, and by this it allows the use of a very short arm in the center of the roller-bar. We also show in Fig. 4 a modification of the bearing for the equalizing-bar. This bearing is provided with the curved lip, which secures the said bar, and is also provided with flanges, between which the spring of an ordinary side-spring vehicle rests and is secured.

The important object of the above-described truss-rod is, the strain is taken from the wood, and enables the wood to be made much lighter and of one size the entire length, thus making it cheaper to manufacture.

The advantage gained by our bent-wood rubber-block is that it rests its full length against the wheels, and thereby wears much longer than a straight one, and may be cut, sprung, or bent from a flat piece of wood, and applied not only to a metal block-holder, but may be nailed or screwed to any kind of rubber-blocks.

In Fig. 5 we show a means for securing the brake when applied to a hay-wagon. It will be seen from this figure that the rope 10, which is secured to the lever, passes over a pulley, 11, and is secured to the short arm of a lever, 12, the upper end of said lever being connected with a lever, 14, which has its lower end connected by a chain by any suitable means to the front of the wagon. The rope or chain 13 passes through a tapered slot formed in the lever 14 in such a manner that the said cord is drawn tightly into the lower or contracted end of the said slot. The lever is then pressed down in the direction of the arrow upon the load until the said lever passes below the point of connection made by the front chain or cord, when the cord 13 is not only drawn taut, but the brake is firmly applied, and remains so until the lever 14 is released.

Having thus described our invention, what we claim as new, and desire to secure by Letters Patent, is—

1. In a vehicle-brake provided with the roller-bar, constructed as specified, the slotted bearings E, secured to the hound, in combination with the adjustable braces D', substantially as and for the purpose set forth.

2. In a vehicle-brake, the roller-bar secured in bearings constructed as shown and described, in combination with the downwardly-projecting arm F, provided with flanges $f$, which pass up on each side of the coupling-pole, and the herein-described means for applying the brake, consisting of the draw-bar W and rubber-bar G, substantially as and for the purpose specified.

3. In a vehicle-brake, and in combination with a roller bar and arm, F, as shown, the draw-bar W, constructed as described, and having a bearing in a threaded nut secured to the front of the rubber-bar, substantially as set forth.

4. In a vehicle-brake, and in combination with the roller-bar and its connections, as shown, a cord, 10, pulley 11, a lever, 12, the upper end secured by a cord or chain, 13, to the forward end of a lever, 14, provided with a tapered slot, and a cord or chain secured to the front of the wagon, as and for the purpose specified.

5. In a vehicle-brake, the draw-bar constructed as shown, and provided with an adjustable nut having a projecting lip, a truss-rod secured to said nut, and the means for operating the rubber-bar, consisting of roller-bar D, arm F, and an operating-lever, substantially as and for the purpose specified.

6. In combination with the rubber-bar provided with truss-rod and bearings, the metal concaved rubber-block holders provided with projecting lips, as and for the purpose set forth.

HENRY M. CRIPPEN.
JOHN M. CRIPPEN.

Witnesses:
C. E. GARD,
W. W. JOHNSTON.